United States Patent [19]

Hawie

[11] 3,951,448
[45] Apr. 20, 1976

[54] RECEPTACLE ARMREST FOR MOTOR VEHICLES
[76] Inventor: Frederick Hawie, 729 N. Washington Ave., Bridgeport, Conn. 06604
[22] Filed: Apr. 21, 1975
[21] Appl. No.: 570,201

[52] U.S. Cl................................ 297/113; 297/191; 297/194
[51] Int. Cl.²......................................... A47C 13/00
[58] Field of Search ..... 297/112–114, 191, 194, 238

[56] References Cited
UNITED STATES PATENTS
2,824,599  2/1958  Quinlan ......................... 297/113 X
3,596,987  8/1971  Wilson ............................. 297/191

Primary Examiner—James C. Mitchell
Attorney, Agent, or Firm—Arthur A. Johnson

[57] ABSTRACT

There is shown herein an improved means for safely storing articles in motor vehicles comprising a box-like receptacle having a lockable upholstered cover to function as an armrest, the receptacle being mounted on the back support for the backrest cushion of a bench-type motor vehicle seat, particularly the front seat of a passenger automobile, where it is conveniently available to the driver and the passenger seated on the front seat. The receptacle is pivotally mounted on the back support and is upholstered on its bottom and exposed end surfaces so that it may be swung upwardly and lie in a cavity provided in the backrest to receive it. The cover is so pivotally mounted on the receptacle that it will be automatically closed and concealed from access when the receptacle is swung into the backrest. When in lowered, i.e., horizontal position, the cover of the receptacle may serve as a seat for a small child.

2 Claims, 3 Drawing Figures

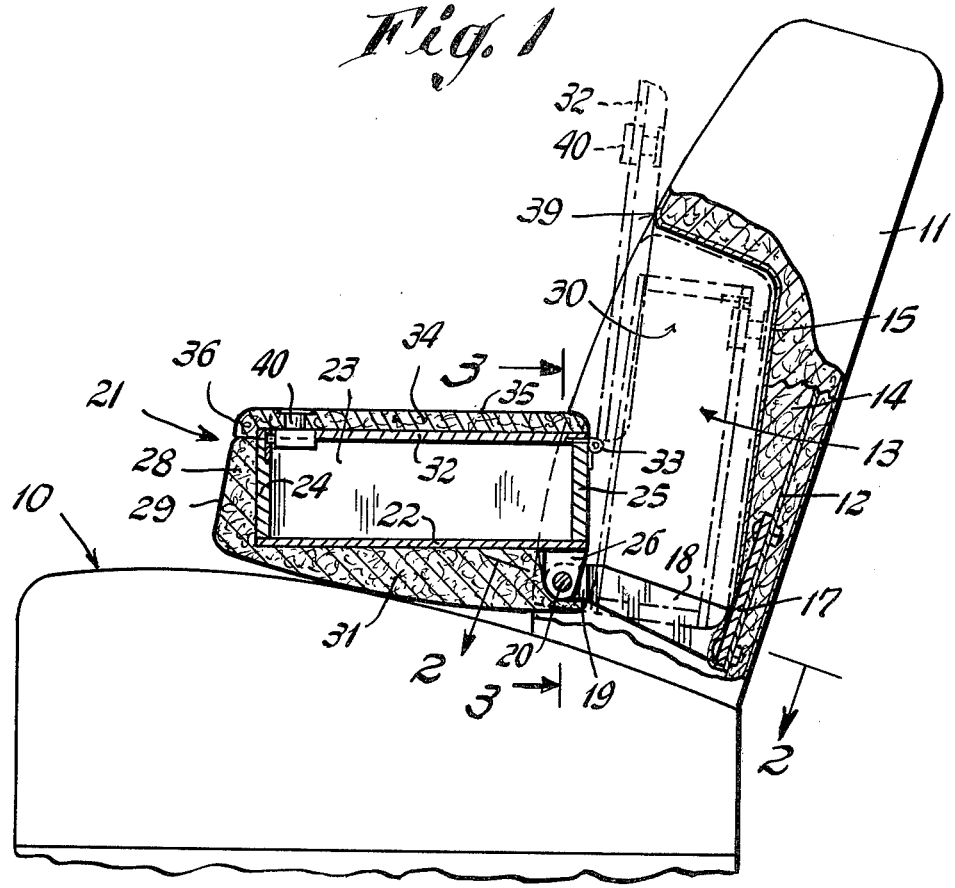
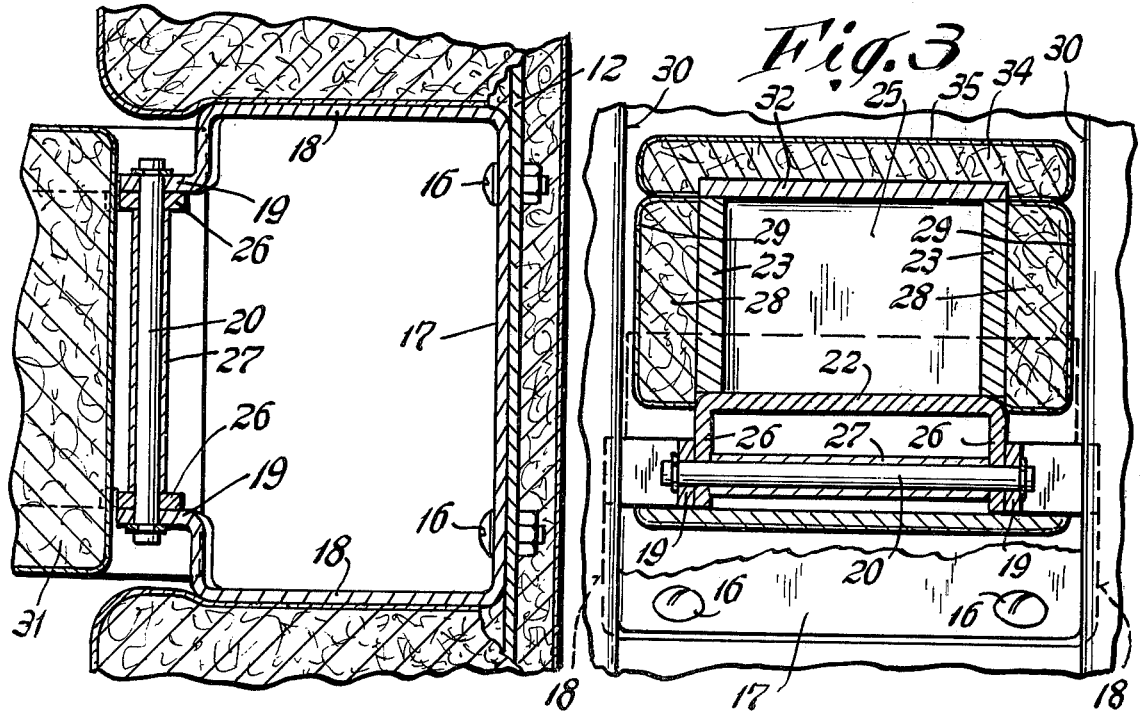

RECEPTACLE ARMREST FOR MOTOR VEHICLES

This invention relates to a seat assembly for a motor vehicle passenger compartment and more particularly to the provision of means for safely storing personal portable articles, such as for instance cameras, tape recorders and tape cassettes which are subject to pilfering if left exposed to view in an automobile.

Such receptacles which are removably supported on a bench-type seat in an automobile and serve as an arm have been heretofore proposed and used. It has also been proposed to provide in bench-type seat assemblies of motor vehicles an armrest which is located centrally in the seat and is pivotally mounted so that it may swing upwardly into a recess in the backrest portion of the seat to accommodate an additional passenger in the front seat.

A feature of the present invention is the provision of a permanently attached hinged armrest for a bench-type vehicle seat which is constructed to serve as a receptacle for miscellaneous articles and which is provided with a hinged cover or door to give access to the interior of the receptacle and which armrest can be swung up from a position of rest on the seat cushion into a recess in the back cushion of the seat assembly.

According to the present invention the front, sides and bottom of the receptacle and the outer surface of the cover are upholstered both for comfort and appearance. Preferably the upholstery is of the same material as that of the seat portion and back portion of the seat assembly so as to be less conspicuous to the casual observer who might be otherwise tempted to tamper with the receptacle.

The cover for the receptacle is advantageously hinged on the receptacle at the inner upper rear edge of the latter and is so positioned that when in open position the cover may rest against the backrest portion of the seat, and, so that, as the armrest is being returned to the cavity in the backrest, the cover will be closed. The lock is preferably of the latch or self-locking type requiring a key or the knowledge of the combination, if it is a combination lock, to release it.

Other features and advantages will hereinafter appear.

In the accompanying drawings:

FIG. 1 is a side elevation of a seat-back assembly with the armrest-receptacle of the present invention in position resting on the seat cushion, the armrest and pocket portion of the backrest being shown in section.

FIG. 2 is a horizontal section taken on the line 2—2 of FIG. 1 of portions of the backrest and the armrest.

FIG. 3 is a vertical section taken on the line 3—3 of FIG. 1.

Referring to the drawings, the seat assembly is of any suitable construction to provide a bench-type seat 10 and a backrest 11 including a supporting plate 12 for the latter.

The backrest 11 has a recess or pocket 13 from which the cushion material 14 is removed or omitted and outlined by suitable covering 15.

Secured to the plate 12 by screws 16 or other fasteners is a yoke 17 having forwardly extending arms 18, the forward ends 19 of which carry a transversely extending rod 20.

The armrest 21 has a frame, as shown by way of example, comprising bottom plate 22, side plates 23, a front end plate 24 and a rear plate 25 secured together to form a box-like receptacle. Ears 26 in the bottom plate 22 are spaced by a sleeve 27 and pivotally mounted on the rod 20.

The sides 23 and front end plate 24 have thereon cushion material 28 and covering 29, and are so shaped that when the armrest is swung upwardly on the rod 20, the arm assembly will slidably fit within the sides 30 of the recess or pocket 13 as indicated in FIGS. 1 and 3. The cushion material 31 on the plate 22 will be substantially coextensive with the cushion material of the seat backrest as shown in dot and dash lines in FIG. 1.

The receptacle is provided with a cover 32 which is connected to the back plate 25 of the receptacle by hinge means 33 and preferably is provided with a layer of cushion material 34 having a covering 35.

When the cover 32 is closed it rests on the side plates 23 and front end plate 24 and the outer end 36 merges with and overlies the cushioning material 28 and covering on the front plate 24 of the receptacle.

The hinge 33 for the cover is so placed that when the cover is raised (open) it lies against the backrest as shown in dot and dash lines in FIG. 1, and, so that, when the armrest is raised and inserted in the pocket 13 the cover 32, if not already closed, will be closed automatically by engagement with the upper edge 39 of the recess.

The receptacle may be provided with a key-operated or combination lock 40 to keep the contents of the receptacle secure. As shown in FIG. 1 in full lines, the lock 40 is in position to be accessible when the armrest is resting on the seat, is inaccessible when the armrest is located in the recess in the seat back as shown in dot and dash lines in FIG. 1. The dimensions of the receptacle are preferably such that it can contain a number of 8-track tape cartridges and other objects conveniently accessible to the driver or the occupant of the adjacent front seat.

The construction of the receptacle is such that it may be used as a seat for a small child.

Variations and modifications may be made within the scope of the claims and portions of the improvements may be used without others. For instance, the receptacle armrest herein described and illustrated may be installed in the back seat of an automobile.

I claim:

1. A seat assembly for a motor vehicle passenger compartment including a seat portion and a backrest portion having a recess open at the front side of the backrest, an armrest pivotally mounted on said backrest portion and movable from a substantially horizontal position supported on the seat portion to a substantially vertical position into said recess in said backrest portion, said armrest comprising a substantially rectangular box having front, rear, side and bottom panels and forming a storage receptacle for holding personal property; a cover for closing said box; means for hingedly connecting said cover to the top of said rear panel adjacent the backrest and positioned so that when it swings upwardly and rearwardly, the cover will rest in engagement with the backrest in position to strike the backrest and be thereby moved to closed position when the armrest is moved into said recess in the backrest, the exterior of the bottom panel of the receptacle being formed and upholstered to conform to the contour of the upholstery of the backrest when the armrest is swung into said recess, the top of said cover being upholstered to function as a comfortable armrest when resting on the seat portion.

2. The invention as defined in claim 1 in which there are means for locking and unlocking the cover in receptacle-closing position, said means being inaccessible when the armrest is in said recess.

* * * * *